W. H. Elliot.
Coffee Pot.
No. 713. Reissued May 10, 1859.
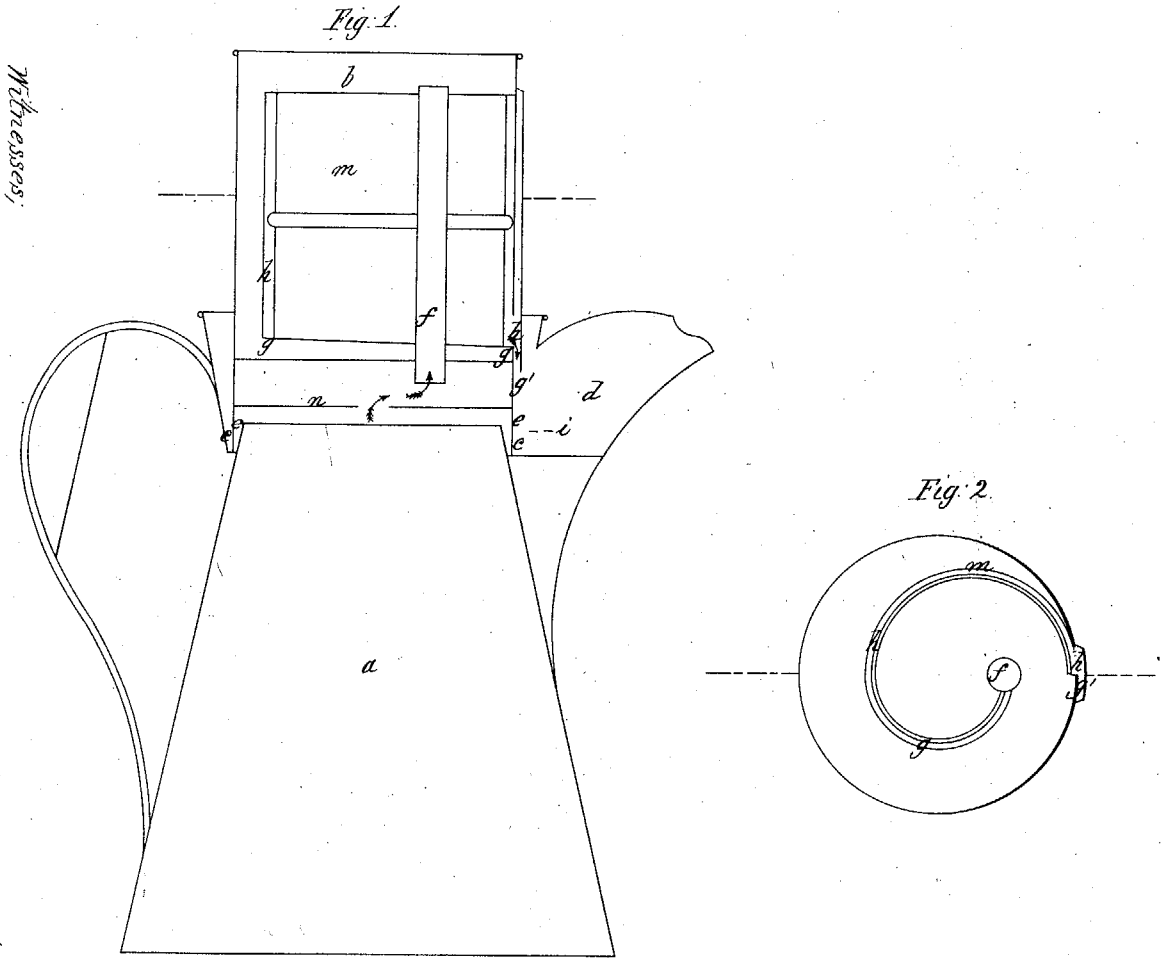
Witnesses;
A. C. Kinsley
G. P. Cozzins
Inventor;
W. H. Elliot

UNITED STATES PATENT OFFICE.

WILLIAM H. ELLIOT, OF PLATTSBURG, NEW YORK.

IMPROVEMENT IN COFFEE-POTS.

Specification forming part of Letters Patent No. 22,716, dated January 25, 1859; Reissue No. 713, dated May 10, 1859.

*To all whom it may concern:*

Be it known that I, W. H. ELLIOT, of Plattsburg, in the county of Clinton and State of New York, have invented new and useful Improvements in Coffee-Pots; and I do hereby declare that the following is a full and exact description thereof, reference being had to the accompanying drawings and the letters of reference marked thereon.

Similar letters of reference indicate the same parts in each figure.

The nature of my invention consists in so constructing a still-worm condenser and a coffee-pot that all condensable vapors shall be reduced to a liquid and return to the coffee-pot by conductors, while a free opening is left through the still-worm for the ingress and egress of atmospheric air, gases, &c., which are not condensable; that the joint between the boiler and condenser shall be made steam tight by means of water, and be kept full by condensed vapor brought to it by conductors from the condenser, and that said joint shall close all the outlets from the boiler, for the purpose of preventing the aroma or volatile oils from escaping from the boiler.

Figure 1 is a perpendicular section of my improved coffee-pot. Fig. 2 is a horizontal section of the condenser, showing within it the still-worm.

*a* is the boiler portion of the coffee-pot; *b*, condenser; *c*, water-joint; *d*, spout; *e*, jacket of the condenser; *f*, tube by which the steam enters the still-worm; *g*, conducting-plate which forms the bottom or lower side of the still-worm; *g'*, conducting or discharge tube, being a continuation of the still-worm, the lower end of which is open; *h*, steam-space within the still-worm; *i*, height of the water in the water-joint; *m*, still-worm; *n*, lower bottom of condenser.

This coffee-pot is used exactly in the same manner that the common one is used without a condenser, with the exception that when the coffee is ready for boiling, instead of closing the top of the coffee-pot with the cover, the condenser must be placed upon the boiler and filled with cold water. It should then be set over the fire and boiled steadily for thirty minutes. If the fire be too hot, like any other coffee-pot, it will boil over; but this may be prevented in most cases by filling the boiler only about two-thirds full before boiling. After the coffee has been boiled, as much boiling water as is required may be poured in without reference to the water-joint. It is well to pour a little water into the water-joint before placing the condenser upon the boiler, though the condensed vapor would soon fill the joint if this were neglected. After the coffee has been boiled sufficiently, the condenser may be removed from the boiler and the cover placed upon it. It is then ready for use. The vapor which is created by the boiling coffee passes up tube *f*, thence into the still-worm *m*, and before it reaches the discharge tube *g'* the vapor is condensed to a liquid and is discharged into the water-joint, from which it falls into the boiler, while any air that may have been shut up in the boiler passes out at the external opening of the still-worm at *g'*.

In this coffee-pot the water joint or trap is arranged below the spout, by which two important purposes are served: First, no vapor can pass out at the spout without first passing the water-joint; second, the water from the joint may be poured out with the coffee. The conducting-plate *g*, or bottom of the still-worm, is depressed at its outer end so that the condensed vapor is inclined to run toward the tube *g'*, and so by means of the still-worm and tube *g'* the condensed vapor is conducted into the water-joint. Similar conductors may also be used within the boiler to conduct the condensed vapor into the water-joint, so that by the action of the condenser and conductors together the water joint is at once filled and kept full while the coffee is boiling.

In closing the coffee-pot at any time a considerable quantity of atmospheric air must be shut up in the boiler. Gases not condensable are also evolved by heating the coffee-grounds, both of which must pass out of the boiler. Any change in the amount of heat applied to the boiler by moving it to a cooler position will cause the steam to be condensed suddenly, and consequently the atmospheric air will force itself into the boiler at any opening to fill the vacuum. It is therefore necessary that there should be provided an opening for air and gases between the interior of the boiler and the external air, so that they may find ingress and egress without passing through the water-joint; otherwise they would partially, if not entirely, force the water out of the joint, and thereby interrupt the operation of the condenser. The opening at $g'$ effects this purpose, and it is so arranged that nothing can pass from the interior of the boiler out without first passing over a greater portion of the condensing-surface, so that the condensable gases may be reduced to a liquid before they reach the external air, and then turned into the boiler again by conductors. For the accomplishment of these ends a still-worm condenser provided with conductors for directing the condensed vapor back to the boiler, so as to save the aroma, is particularly applicable. In such a condenser the vapor which contains the aroma does not mix with the condenser-water, but is sent back into the coffee-pot pure and in a liquid state, after having been separated by the condenser from the non-condensable gasses. In this condenser the water may be changed as often as is necessary to keep it at required temperature without throwing away the aroma, nor is there any aroma lost by the steaming of the condenser-water while the coffee is boiling.

It is not necessary to the successful operation of the condenser that the worm should be entirely covered or surrounded by water, nor is any peculiar shape, curve, or position of the worm essential, provided it be an elongated or extended passage through which the steam and gasses from the boiler must pass in their egress to the open air.

I do not claim condensing the vapor of coffee so as to prevent the aroma from passing off, independently of the peculiar devices and the method of employing them as herein set forth; but What I do claim, and wish to have secured to me by Letters Patent, is—

1. The combination of boiler $a$, still-worm condenser $b$, conducting-plate $g$, and the external opening of the still-worm at $g'$, when these devices are so arranged in relation to each other that an opening to the external air shall be provided for the non-condensable gases, while the condensable vapors are reduced to a liquid without coming in contact with the condenser-water, and then turned by conductors into the boiler, as and for the purpose specified.

2. The arrangement of the joint $c$ below the spout so that no vapor can pass through the spout without first passing the joint, as set forth.

3. The employment of conductors, in combination with the condenser, for the purpose of filling the water-joint or keeping it full, as and for the purpose specified.

W. H. ELLIOT.

Witnesses:

JAS. H. CARTER,

G. F. NICHOLS.